United States Patent [19]
Bedwell et al.

[11] 3,997,118
[45] * Dec. 14, 1976

[54] LIQUID MANURE HANDLING MACHINE

[75] Inventors: Thomas A. Bedwell, Providence; Bruce L. Call, Logan, both of Utah

[73] Assignee: Hesston Corporation, Hesston, Kans.

[ * ] Notice: The portion of the term of this patent subsequent to Aug. 12, 1992, has been disclaimed.

[22] Filed: Aug. 1, 1975

[21] Appl. No.: 601,324

Related U.S. Application Data

[63] Continuation-in-part of Ser. No. 426,632, Dec. 12, 1973, Pat. No. 3,889,066.

[52] U.S. Cl. .............................. 239/651; 239/662; 239/675; 239/689
[51] Int. Cl.² .......................................... A01C 3/06
[58] Field of Search .......... 239/651, 662, 675, 672, 239/676, 680, 683, 689, 142; 259/6, 41, 104

[56] References Cited
UNITED STATES PATENTS

| | | |
|---|---|---|
| 3,011,793 | 12/1961 | McElhinney et al. ............. 239/651 |
| 3,206,215 | 9/1965 | DeJong .............................. 239/651 |
| 3,396,912 | 8/1968 | Sahlstrom ....................... 239/689 X |
| 3,797,807 | 3/1974 | Behrens ................................. 259/6 |
| 3,825,231 | 7/1974 | McFarland et al. ........... 259/104 X |
| 3,899,066 | 8/1975 | Bedwell et al. ................. 239/651 X |

Primary Examiner—John J. Love
Attorney, Agent, or Firm—Schmidt, Johnson, Hovey & Williams

[57] ABSTRACT

A liquid manure transport implement is provided with a vertically retractable loader and a spreader which are arranged to fit neatly within the general width and height dimensions of the manure tank on the rear end of the latter. An internally carried conveyor unit, associated with the loader and the spreader, has a pair of parallel, opposite lead augers mounted over the tank bottom in juxtaposition to the latter for swirling and agitating the manure within the tank and for concurrently functioning as conveyors during loading and unloading. The externally disposed spreader has a sump which extends slightly below the bottom of the tank to facilitate delivery of manure to the spreader by the conveyor unit during unloading of the tank.

8 Claims, 9 Drawing Figures

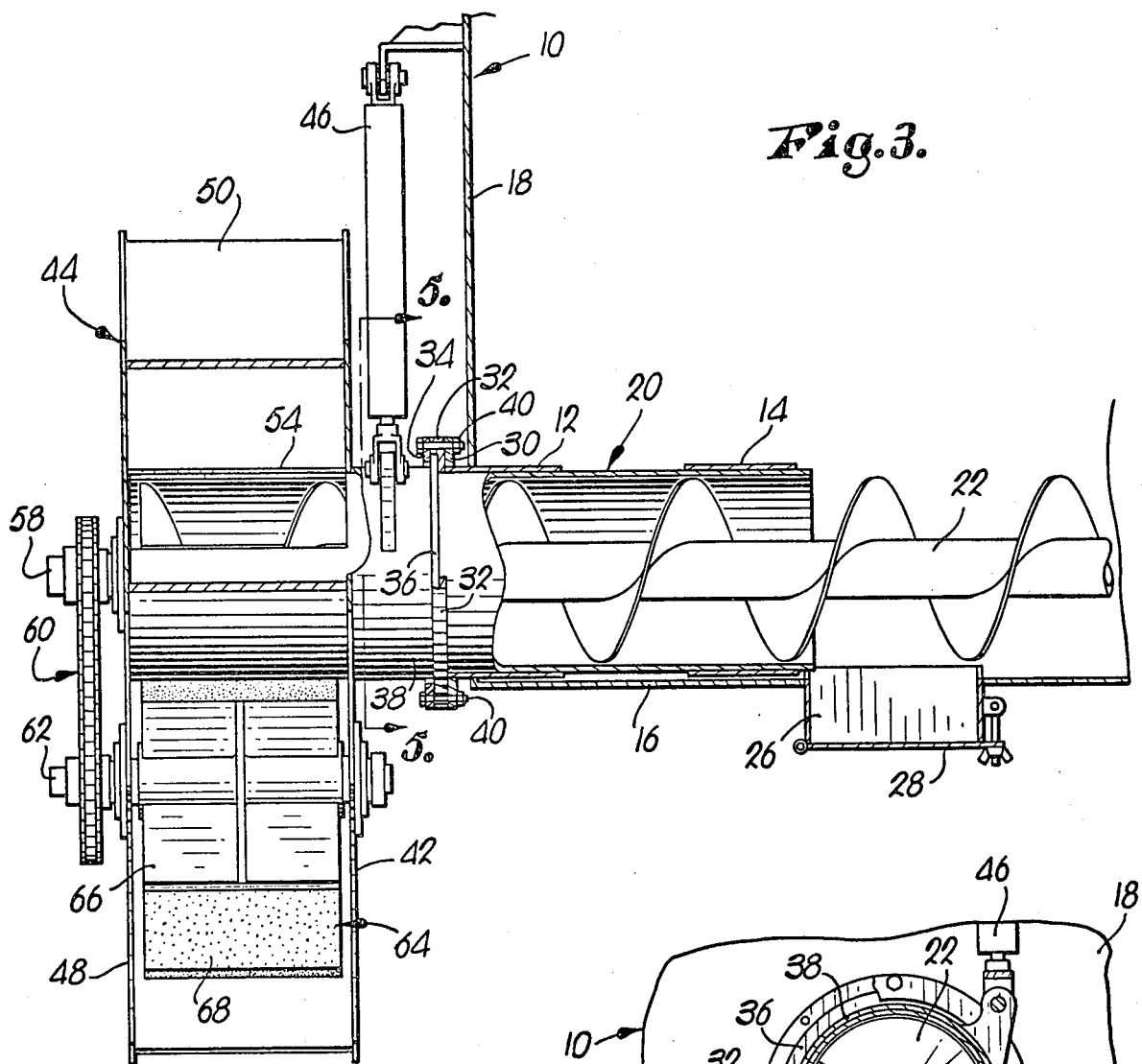
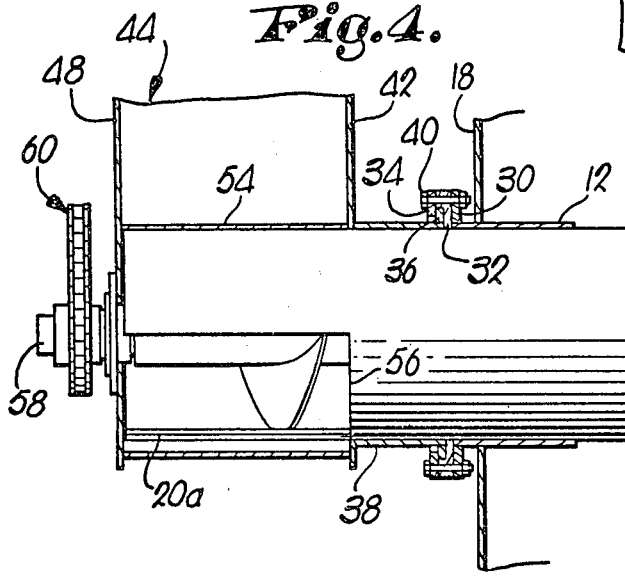
Fig.4.
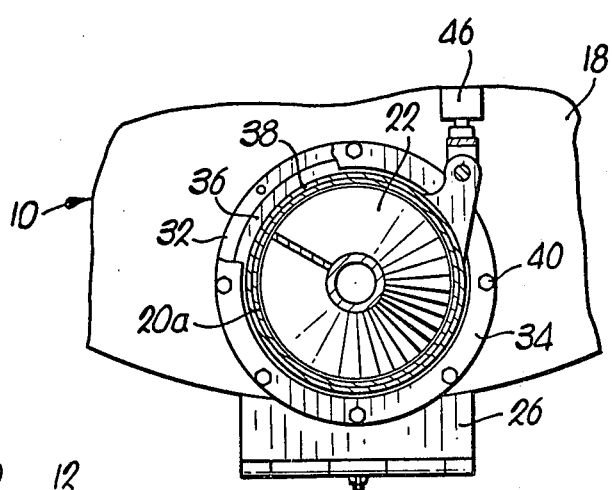
Fig.5.

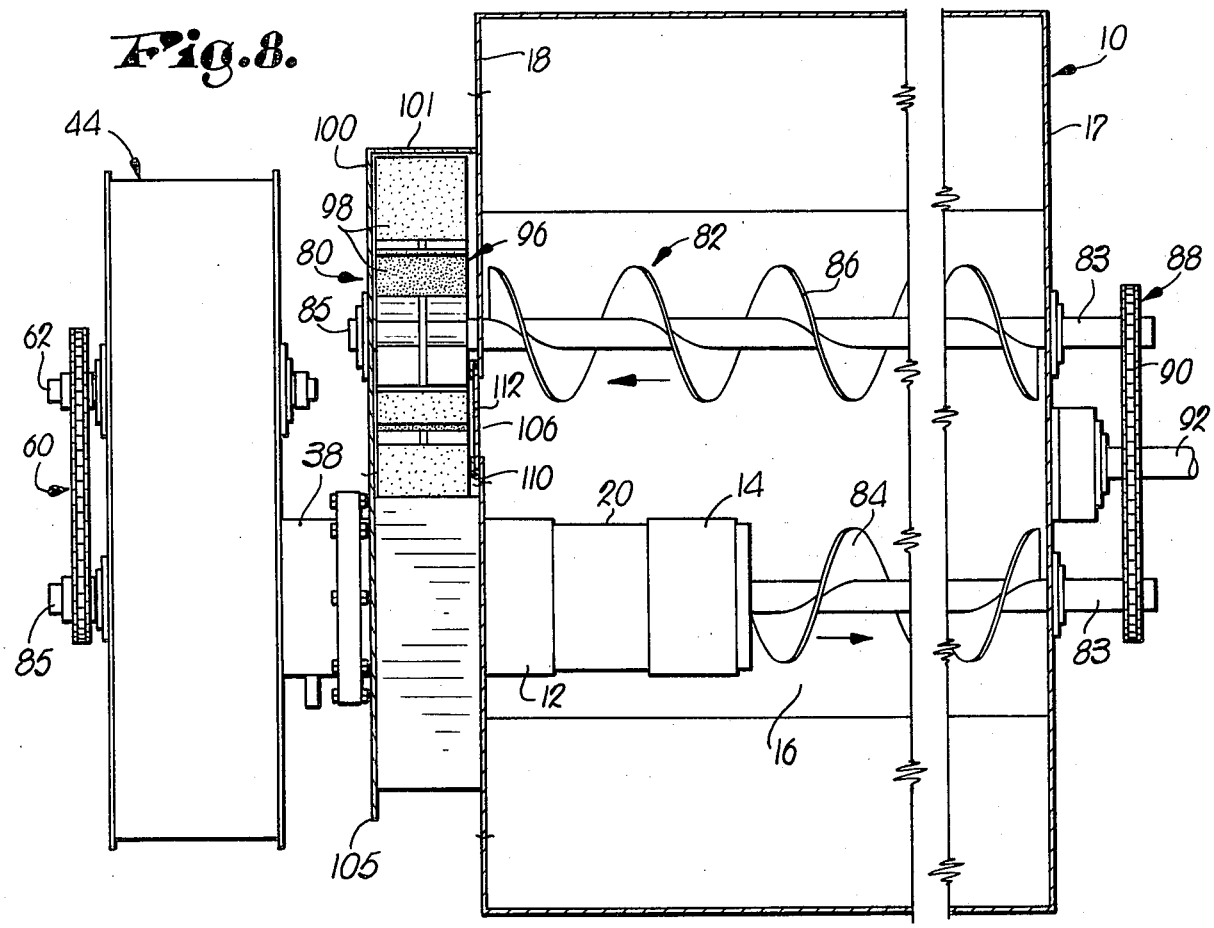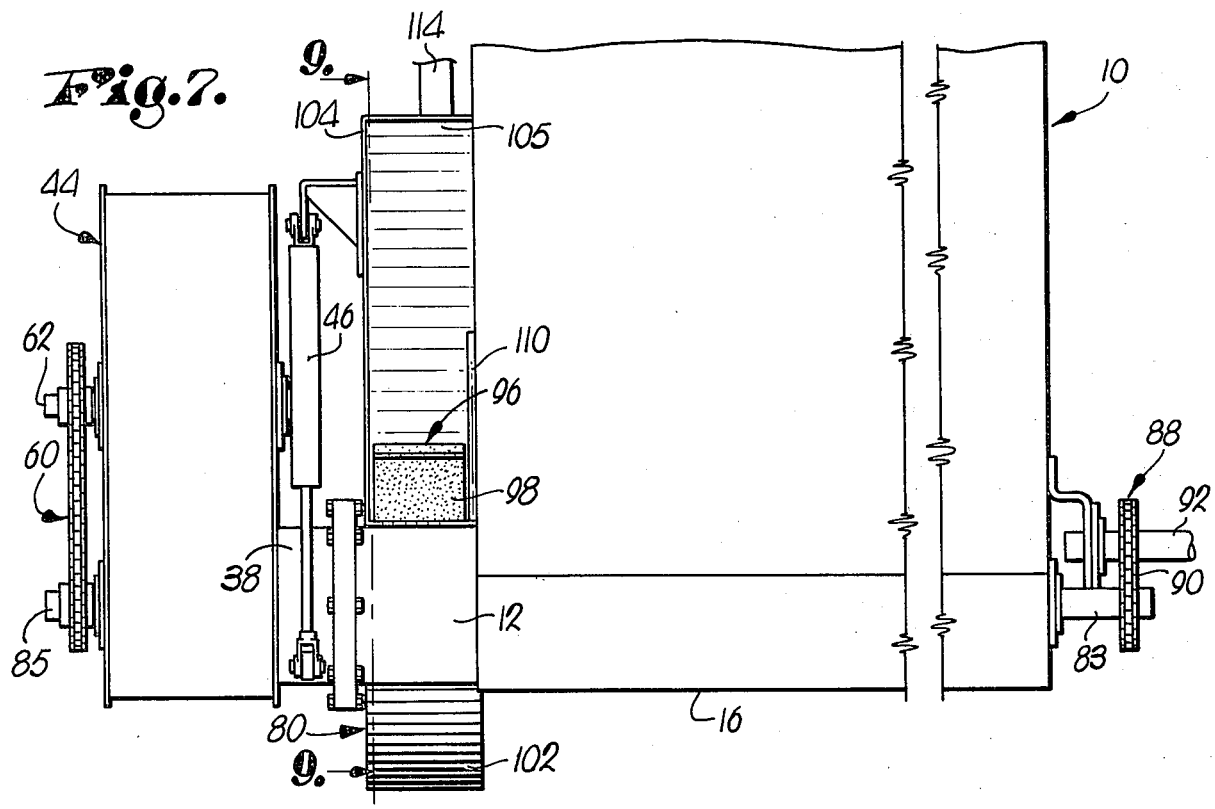

LIQUID MANURE HANDLING MACHINE

CROSS REFERENCES

This is a continuation-in-part of our prior copending application entitled "LIQUID MANURE LOADING APPARATUS", Ser. No. 426,632, filed Dec. 12, 1973 now U.S. Pat. No. 3,899,066.

This invention relates to systems for handling manure produced as a fertilizer and, more particularly, to the loading and unloading of the manure in relation to an implement for transporting the manure.

An important object of this invention is to improve upon the teachings of our prior copending application entitled "LIQUID MANURE LOADING APPARATUS", Ser. No. 426,632 and filed Dec. 12, 1973 now U.S. Pat. No. 3,899,066.

It is another important object of the present invention to provide a liquid manure implement with an improved means for agitating manure carried by the implement.

Pursuant to the foregoing object it is another important object of our invention to provide a liquid manure tank with a conveyor unit disposed adjacent the tank bottom having a pair of parallel, opposite lead augers which may be rotated concurrently to create counter moving currents within the tank.

Yet another important object of the instant invention is to provide a liquid manure handling implement with a loader and a spreader both positioned on the rear end of the implement and so arranged as to avoid mutual interference with one another during their respective operations. In the drawings:

FIG. 3 is a fragmentary, vertical cross-sectional view of the apparatus taken along irregular line 3—3 of FIG. 1;

FIG. 4 is a fragmentary, horizontal, cross-sectional view of the apparatus taken along line 4—4 of FIG. 1;

FIG. 5 is a fragmentary, vertical cross-sectional view through the loading auger of the apparatus taken along line 5—5 of FIG. 3;

FIG. 7 is a side elevational view thereof;

FIG. 8 is a fragmentary, horizontal cross-sectional view of the apparatus; and

DESCRIPTION AND OPERATION OF FIGS. 1–5

Figure 1:
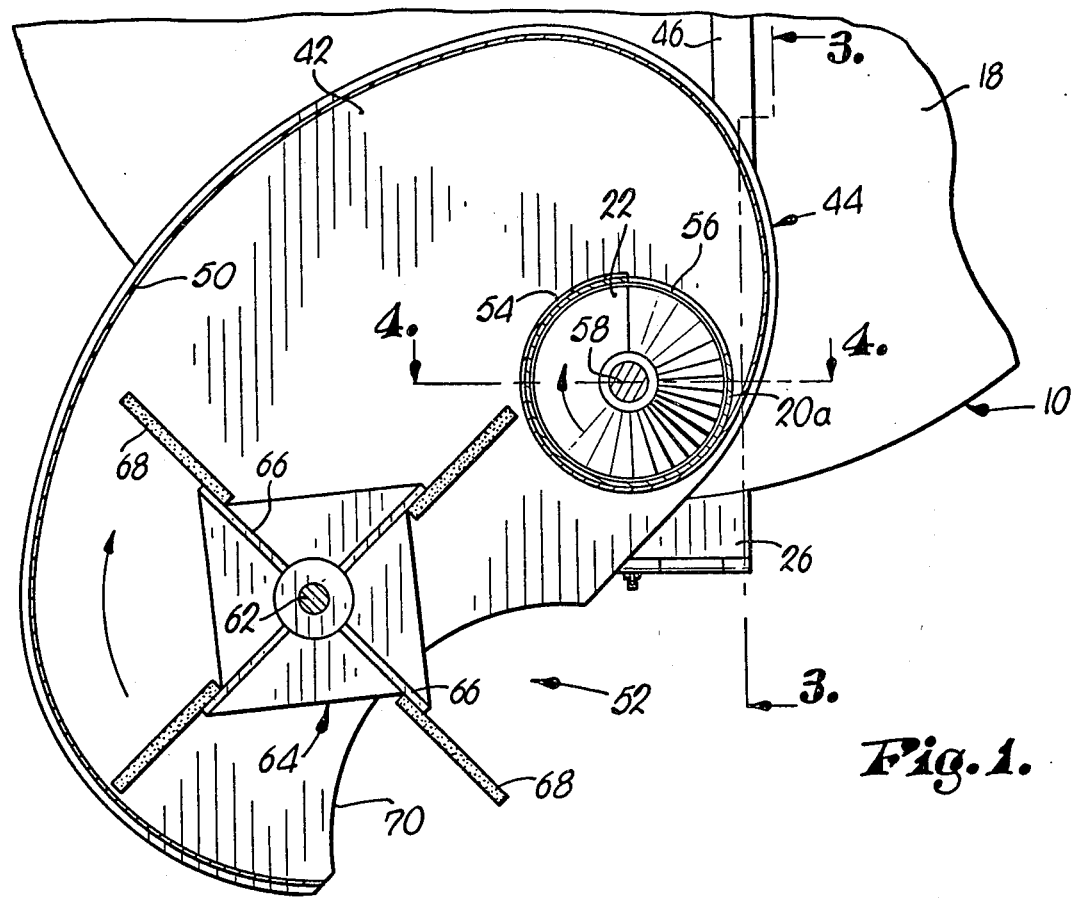
FIG. 1 is a fragmentary, end elevational view of the loading apparatus with the rear sidewall of the pickup housing removed and parts shown in cross section for clarity, the housing being illustrated in its loading position.

The apparatus of the present invention is adapted for use in connection with a tank 10 which is fragmentarily shown in the drawings, and it is to be understood that tank 10 is preferably rendered mobile through the use of suitable ground-engaging wheels (not shown). Further, it is to be understood that the tank 10 could, of course, form a part of a pull-type implement requiring the latter to be hitched to a suitable tractive vehicle, or it could form a part of a self-propelled implement. Preferably, the apparatus is mounted at the rear of tank 10 so as to allow the implement to be backed into the pool of liquid manure for loading purposes, although this too, is subject to variation and the principles of the present invention are not limited to such a rear-mounted arrangement.

The tank 10 has a pair of mounting collars 12 and 14 located adjacent and secured to the bottom 16 of tank 10, with the collar 12 projecting rearwardly through rear wall 18 of tank 10 and collar 14 spaced a distance inwardly from the latter. Tube structure 20, open at least at its inner end, is fixedly carried by collars 12 and 14 within tank 10 and projects outwardly beyond rear wall 18 for a substantial distance. A conveyor in the nature of a rotary auger 22 is coaxially disposed within tube 20 and terminates rearwardly at the same point as the latter, the forward end (not shown) of auger 22 being drivingly coupled with an appropriate drive source, such as the power takeoff of a tractor. The bottom 16 of tank 10 is provided with a stone sump 26 for collecting stones which may enter tank 10 through the loading apparatus, and sump 26 is provided with a hinged door periodically removing the collected stones. The collar 12 has an exterior ring 30 welded thereto which abuts a similar ring 32 fixed to tube 20, the rings 30 and 32 cooperating with a third, independent clamping ring 34 to define a track for capturing a fourth ring 36 forming a part of a third collar 38 that is rotatably supported on tube 20. A series of circumferentially spaced bolts 40 releasably fasten the rings 30–36 together so that tube 20, collar 38 and auger 22 may be removed from tank 10 for shipping or maintenance purposes.

The third collar 38 is fixed at its outer end to one sidewall 42 of a generally elliptical housing 44 whereby to adapt housing 44 for swinging movement about tube 20 with rotatable collar 38. A fluid pressure piston and cylinder unit 46 operably interconnects rear wall 18 of tank 10 and collar 38 for swinging housing 44 between the lowered, loading position thereof illustrated in FIG. 1, and the raised, transport position thereof illustrated in FIG. 2.

The housing 44 has a second sidewall 48 spaced rearwardly from sidewall 42, and an arcuate, generally spiral guide wall 50 that extends transversely between sidewalls 42 and 48 along one stretch of the latter but is discontinuous along the opposite stretch thereof to define an intake area 52 for housing 44. As illustrated, the guide wall 50 leads away from intake 52 at one end of wall 50 and extends arcuately in an elongated convolution until approaching the tube 20 which it almost entirely envelops in a tighter convolution having its center coincident with the axes of the tube 20, auger 22 and the axis of swinging movement of housing 44. The innermost terminal portion 54 of wall 50 is shiftable circumferentially about tube 20 to present a valve cover for an inlet 56 located within the first 80° of the wall 20a of tube 20. Thus, as illustrated, the inlet 56 is generally upwardly facing, is approached by guide wall 50 in spaced, spiral relationship from above the same, and is automatically closed and opened by terminal portion 54 during raising and lowering of housing 44 between the positions illustrated in FIGS. 1 and 2.

The auger 22 has an extended shank 58 that projects rearwardly beyond sidewall 48 and carries a chain and sprocket assembly 60 that is coupled with a shaft 62 extending through housing 44 in spaced, parallel relationship to auger 22. The shaft 62 is disposed adjacent intake 52 and carries a loader-agitator impeller 64 having a plurality of wide, radially extending paddles 66 provided with flat impact surfaces extending transversely between sidewalls 42 and 48. Preferably, each paddle 66 has a flexible, flat rubber tip 68 that defines such impact surface. A pair of segment-shaped cutouts 70 are provided on the two opposed sidewalls 42 and 48 adjacent intake 52 in order to expose the tips 68 laterally during rotation of impeller 64. As illustrated, the tips 68 sweep along guide wall 50 in close proximity thereto during rotation of impeller 64 in the direction illustrated in FIG. 1 whereby to draw material into housing 44 in the manner hereinafter described.

Figure 2:
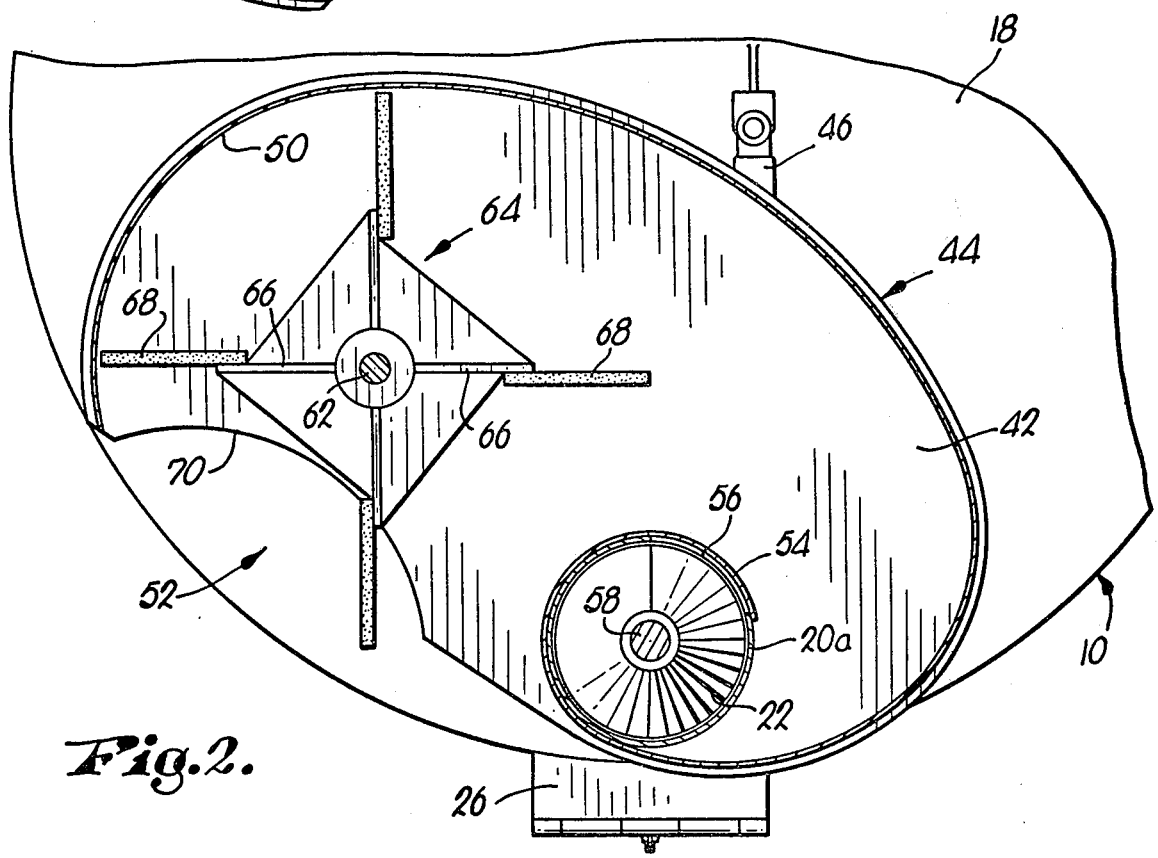
FIG. 2 is a view similar to FIG. 1 but with the pickup housing raised to its transport position.
Figure 6:
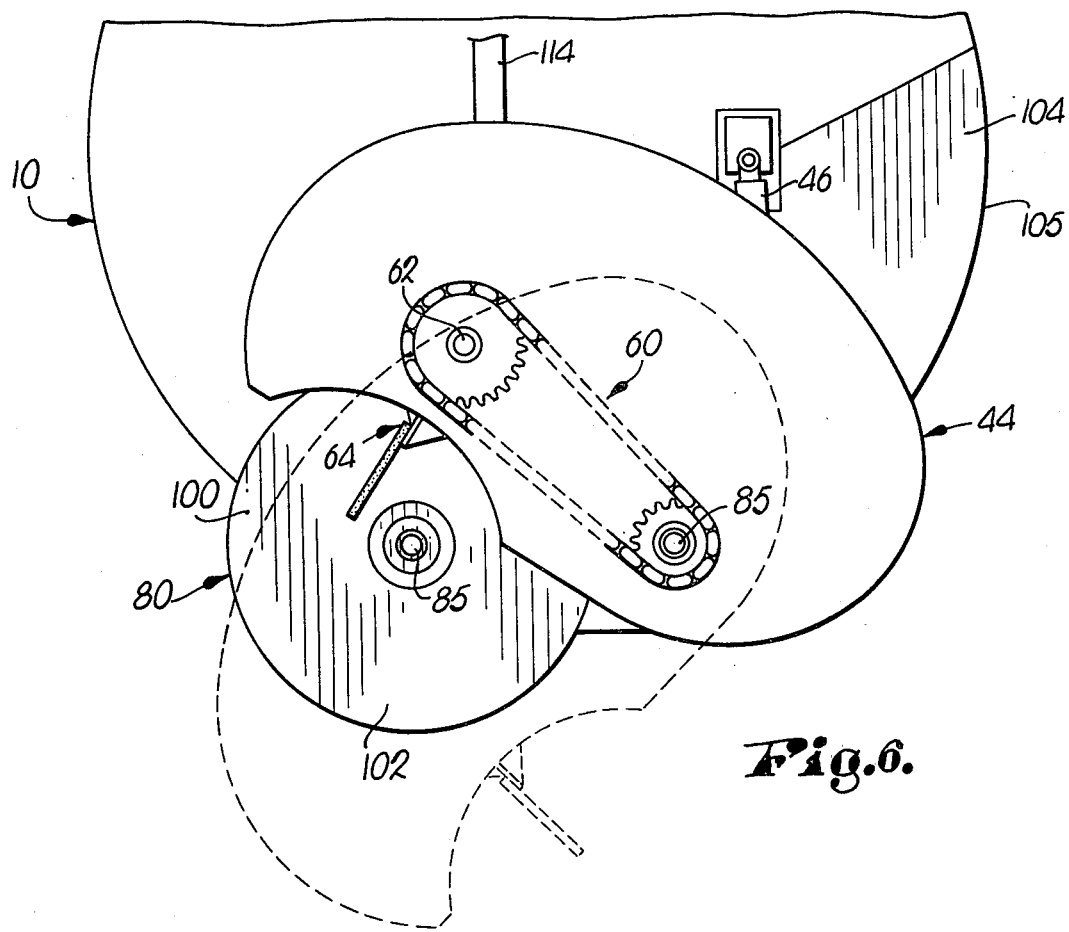
FIG. 6 is a fragmentary and elevational view of the manure handling apparatus with the loader and spreader both mounted on the rear end of the tank.

In use, the empty implement is normally maintained with the housing 44 in its transport position as illustrated in FIG. 2 prior to arriving at the reservoir. With housing 44 so positioned the tank 10 is free of downwardly projecting obstructions which might drag on the ground when uneven terrain is encountered. Thus, in its transport position, the housing 44 is well protected against structures which might pass beneath the implement during advancement thereof and which might otherwise strike the housing 44 and seriously damage the loading apparatus.

Upon reaching the reservoir, the implement is moved down a ramp normally provided at such reservoirs until the level of the pool of manure approaches the bottom 16 of tank 10 at its intersection with rear wall 18. Thereupon, the fluid pressure to unit 46 may be released a sufficient extent to allow the housing 44 to swing downwardly in a counterclockwise direction as viewed in FIG. 2, until reaching its loading positon as illustrated in FIG. 1 wherein the intake 52 is inserted into the pool of manure. Acutation of the power take-off of the vehicle or other drive means for the auger 22 in the proper direction, causes auger 22 to rotate clockwise, viewing FIG. 1, and such driving power is simultaneously transmitted to the impeller 64 through chain and sprocket assembly 60 to concurrently spin impeller 64 rapidly in a clockwise direction as illustrated in FIG. 1.

Rotation of the impeller 64 causes the paddles 66 to impinge upon the manure within the immediate vicinity of intake 52 and to draw the same into housing 44, not only from a direction to the right of intake 52 (viewing FIG. 1), generally perpendicular to the axis of rotation of impeller 64, but also in a lateral direction through the cutouts 70 in sidewalls 42 and 48. As the material is drawn into housing 44 between the impeller shaft 62 and guide wall 50, it is swept rearwardly and swirled upwardly along guide wall 50 in an elliptical path until reaching the top of housing 44 where it turns down into inlet 56. The auger 22 then carries the material from inlet 56 through tube 20 and into the interior of tank 10 to fill the same.

So long as both the impeller 64 and the auger 22 continue to rotate in the clockwise directions illustrated in FIG. 1, the manure flows into tank 10 without any retrograde escape from the latter back through the inlet 56 and intake 52. Thus, the filling efficiency of the loading apparatus is quite high and the loading process can be carried out in a remarkably short span of time.

Once the tank 10 has been filled, as evidenced by a suitable float device or the like (not shown) on the top of tank 10, the piston and cylinder unit 46 is actuated, while the auger 22 and impeller 64 continue to rotate, so as to swing the housing 44 into its transport position illustrated in FIG. 2. This causes the terminal portion 54 of guide wall 50 to shift circumferentially to the right from its position illustrated in FIG. 1, into covering relationship with the inlet 56 as illustrated in FIG. 2, thus effectively closing inlet 56 and preventing the escape of the manure from tank 10. The continued operation of auger 22 and impeller 64 during the raising of housing 44 assures that retrograde escape of the manure cannot occur during the interval that the terminal portion 54 is moving across inlet 56. Once housing 44 is fully raised, the auger 22 and impeller 64 can be disengaged and the tank 10 will remain filled with manure without any escape thereof through the sealed inlet 56.

During the time that the manure is stored within the reservoir, it has a tendency to separate into several different levels which include a bottom level of heavier substances frequently containing a number of stones, an intermediate level of slurry, and a top level consisting of a crust which is formed from feed material contained in the manure. It is important that these various levels be thoroughly mixed together prior to or during removal thereof from the reservoir because each level has definite value as fertilizer material, because without periodically disturbing the lowermost level the reservoir would tend to gradually reduce itself in size by a buildup of accumulated matter on the bottom thereof, and because the hard crust can create handling problems not only during loading, but also during spreading. In this respect, the loading apparatus of the present invention has proven to be highly desirable and successful because its impeller 64 so aggressively churns and agitates the manure during the loading process that no separate agitating step is required prior to actual loading of the implement as has heretofore been common practice. Not only does the impeller 64 thoroughly intermix the lowermost liquid levels of the pool, it also pulls the top crust of the pool toward the implement during loading and causes such crust to break apart and be thoroughly admixed with the liquid being drawn through intake 52. The result is a common slurry having crust particles of a size that can be easily handled by the apparatus. Substantial savings of valuable time and effort are obtained by the agitating ability of the present loading apparatus since it is only necessary for the operator to back the implement into the reservoir without prior agitation thereof and immediately begin to load the tank 10.

During the loading procedure the implement need not be backed into the reservoir to such deep extent as to jeopardize withdrawing the same from the reservoir when the level of the pool has reached a relatively low point. By virtue of the ability to place the intake 52 at a point substantially below the bottom 16 of tank 10 well into the pool of manure, the rear end of the tank 10 need not be inserted into the pool to the extent required with prior implements. Thus, not only is the loading procedure more safely carried out with the present invention, but the pool itself can be more fully drained than was heretofore possible.

It is important also to recognize that the automatic sealing or closing of the inlet 56 by the housing 44 when the latter is raised is a highly desirable feature of the present invention. Terminal portion 54 always closes inlet 56 when housing 44 is raised, and it maintains inlet 56 well sealed until housing 44 is purposely lowered. The automatic closing arrangement of the present invention assures that the loading operation can be carried out easily, rapidly, and without accidental spillage.

As earlier mentioned, it is not uncommon for the lower level of the manure pool to contain hard foreign objects such as stones. Because it is practically impossible to remove such stones from the pool prior to loading, the apparatus of the present invention has been designed to accept the stones during the loading process without jamming and without damage. In this respect, it is to be noted that the flexible tips 68 of the paddles 66, while being fully adequate to propel the manure and stones upwardly through the housing 44, are inherently capable of yielding when necessary to avoid lodging one or more stones between impeller 64 and guide wall 50. Moreover, the stones are well controlled during their travel through the apparatus, first being swirled upwardly along guide wall 50 and then entering inlet 56 from above the latter. This gravitational entry of the stones into inlet 56 has the beneficial effect of causing the stones to readily settle within tube 20 along the lower extent of the auger flighting, whereupon they can be easily pushed into tank 10 to drop into sump 26.

If necessary or desirable, the housing 44, a pivot tube 20, and a part of auger 22 can be completely removed from tank 10. In this respect, loosening and removal of the bolts 40 allows the outer clamping ring 34 to be pulled away, hence permitting housing 44 with its collar 38 to be pulled off tube 20 when unit 46 is disconnected. Tube 20 itself thus becomes released, permitting its removal, and at least a rear section of auger 22, such as behind sump 26, can be subsequently withdrawn, provided any suitable connector (not shown) joining the front and rear sections of auger 22 above sump 26 has first been released. For this purpose, access can be had through sump 26.

DESCRIPTION AND OPERATION OF FIGS. 6–9

In many instances it is desirable to unload manure carried by tank 10 from the rear of the tank while at the same time maintaining the advantages of the unique rear-mounted retractable loader. For this purpose, the tank 10 may be provided with a rearwardly disposed distributor 80 mounted on end wall 18. Additionally, the single conveyor 22 of FIGS. 1–5 may be replaced by a dual auger conveyor unit 82 for feeding manure to the distributor 80, for drawing fresh manure into tank 10, and for aggressively agitating manure carried within the tank 10 prior to and during unloading.

Conveyor unit 82 includes a conventional, rotatable right-hand auger 84 coaxially disposed within tube structure 20, and an analogous left-hand auger 86 spaced horizontally from auger 84 in parallel relationship to the latter. The augers are rotatably mounted within tank 10 in proximal, overlying relationship to bottom 16.

Each auger 84, 86 is provided with a cylindrical front end extension 83 and an opposite rear end extension 85. The front extensions 83 project through a front wall 17 of tank 10 and are operably interconnected by transmission means 88 for concurrent rotation of the augers 84, 86. Transmission means 88 comprises a drive shaft 92 and a chain and sprocket assembly 90 for transmitting power from shaft 92 to extension 83 of augers 84, 86. It will be noted that due to the arrangement of chain and sprocket assembly 90, augers 84, 86 are rotated in the same direction when drive shaft 92 is actuated by the power takeoff shaft of a towing vehicle, for example. Rotation of shaft 92, in a counterclockwise direction when viewed from the front of tank 10, will cause unidirectional rotation of augers 84, 86 to produce oppositely directed streams of material moving in the directions shown by the arrows in FIG. 8.

Figure 9:
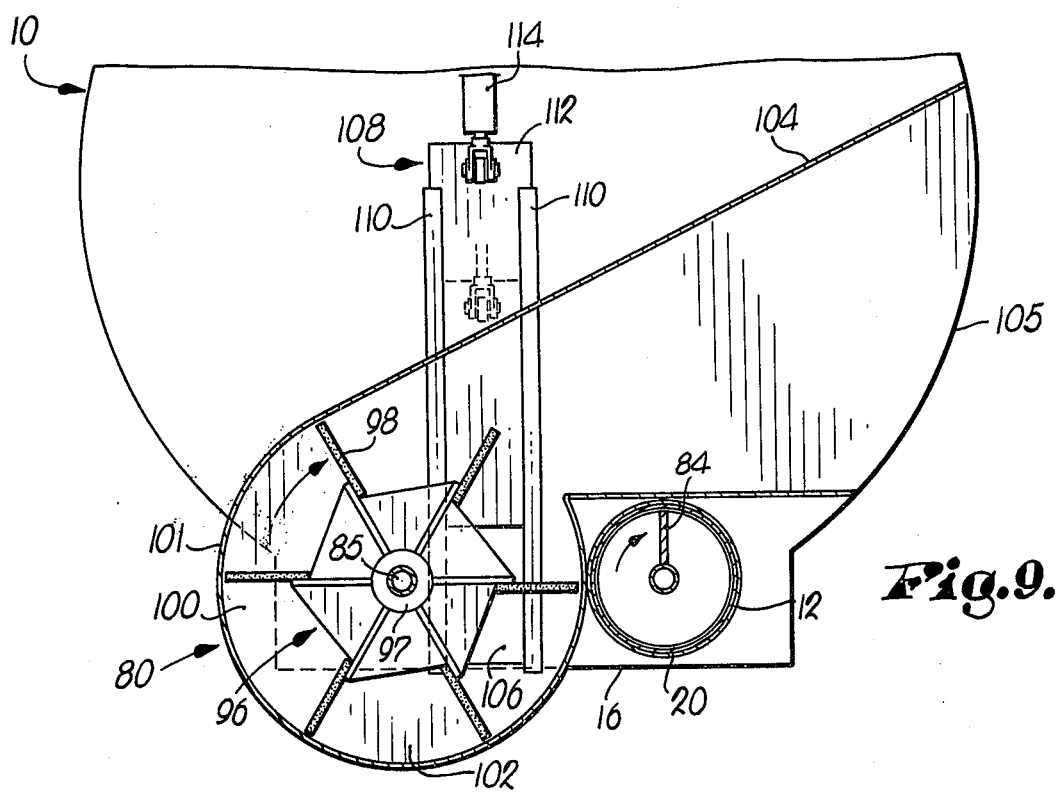
FIG. 9 is a fragmentary cross-sectional view taken along line 9—9 of FIG. 7.

Distributor 80 is mounted on rear wall 18 and comprises a rotor 96 coaxially carried within a generally cylindrical casing 100. The cylindrical periphery of casing 100 is defined by a wall 101 which terminates at the upper portion of casing 100 to present an opening into the latter for communicating with a discharge chute 104 as shown in FIG. 9. The portion of casing 100 which extends below the bottom 16 of tank 10 defines a sump 102 for collecting manure during unloading. Chute 104 flares outwardly from its intersection with wall 101 to form a large rectangular discharge opening 105 at the outermost terminus of chute 104.

The rotor 96 of distributor 80 includes a hub 97 having a plurality of wide, radially extending fins 98 each having a flat, flexible tip 99 similar to tips 68 of the impeller 64 hereinabove described. The rear end extension 85 of auger 86 projects through rear wall 18 into casing 100, and hub 97 of rotor 96 is fixedly mounted upon extension 85 for concurrent rotation of rotor 96 with auger 86.

A rectangular outlet 106 extends through end wall 18 and opens into casing 100 adjacent rotor 96 to provide an exit passage for manure carried within tank 10. Outlet 106 is opened and closed by a closure assembly 108 which includes a pair of spaced, upright, parallel channels 110 straddling outlet 106, and a planar slide member 112 which is slidably mounted within the space between channel members 110. A hydraulic cylinder assembly 114 extends from member 112 to rear wall 18 and functions to vertically reciprocate member 112 between open and closed positions shown respectively in solid and broken lines in FIG. 9.

In order to accommodate distributor 80, it is necessary to extend the pickup housing 44 rearwardly from end wall 18. This is accomplished by slightly extending the lengths of collar 12 and tube 20, making auger 84 slightly longer than the auger. Additionally, piston and cylinder unit 46 must be anchored at its upper end to the casing 100 rather than the end wall 18.

The operation of the present invention should be apparent from the foregoing description. The manure tank 10 is backed to a pool of liquid manure whereupon pickup housing 44 is lowered into the pool in the manner previously described. Drive shaft 92 is actuated, thereby causing impeller 64 to rotate by virtue of its interconnection with auger 84 through chain and sprocket assembly 60. As previously described, the rotating impeller 64 directs the material through pickup housing 44 and into inlet 56 whereupon the manure is conveyed into the tank by the operation of auger 84. The loading operation is continued until the tank 10 is completely full.

When it is desired to unload the tank, cylinder 114 is simply actuated to remove slide member 112 from its position overlying outlet 106, thereby allowing manure to flow from tank 10 into the sump 102. The drive shaft 92 is then actuated, causing rotation of auger 86 and consequently rotor 96 in the direction shown by the arrow in FIG. 9. Manure flowing into sump 102 is lifted upwardly along the wall 101 of casing 100 by the moving fins 98 of rotor 96 and projected outwardly through chute portion 104 and discharge opening 105. This operation is, of course, performed while tank 10 is being advanced through a field to cause the manure to be spread evenly over the ground.

It has been explained previously that unidirectional rotation of the opposite lead augers, 84, 86 will create adjacent, oppositely directed streams of manure within tank 10. The counter-moving streams of manure serve to mix, blend, and liquefy the manure in tank 10 not only by the action of the augers themselves, but also by shearing action at the interface of the countermoving streams. The mixing function occurs both during loading and unloading or, by merely closing inlet 56 and outlet 106 and operating the drive shaft 92 to power the augers 84, 86 mixing of manure stored within tank 10 can be accomplished without adding or removing manure from the tank.

While it is recognized that cooperating opposite lead augers per se are old and have been used, for example, in grain mixing tanks, the unique arrangement of the opposite lead augers 84, 86 of the present invention in juxtaposition with the bottom 16 of the tank 10 is believed new in the art and presents distinct advantages over previous auger arrangements. Should manure remain in the tank 10 for an extended period of time such that the manure settles into layers, the augers 84, 86 easily remix the material notwithstanding the fact that the heaviest constituent of the admixture will have settled to the bottom of the tank. Consequently, there is virtually no possibility of a sludge buildup developing within tank 10. Perhaps more importantly, positioning of the opposite lead augers 84, 86 adjacent the bottom 16 of tank 10 allows the augers to function in a dual capacity as aggressive mixers and as efficient conveyors during loading and unloading of the implement.

As it is preferable to advance the tank across a field during unloading, conventional front-mounted unloaders can exhibit a highly undesirable characteristic of throwing manure onto the tank itself as a result of blowback when the implement is unloading. Side-mounted unloaders near the rear of the tank correct the blowback problem but present bulky protrusions extending beyond the general dimensions of the tank and are thereby vulnerable to transport damage when the tank is pulled through a narrow gate, for example. It is, then, desirable to provide a rear-end mounted unloading device for a liquid manure spreader to avoid throwing the material on the body of the tank as the tank is progressively unloaded over a field. However, the nature of the present invention demands that the loader also be mounted on the rear end of the tank to provide easy access of the loader to the manure pool. The unique arrangement of the loader and unloader in the present invention allows both of these devices to be mounted on the rear end of the tank 10 without the necessity of bulky protrusions beyond the general overall dimensions of the tank itself.

Additionally, the provision of a sump in the spreader 80 facilitates unloading of tank 10. Manure discharged through outlet 106 gathers in sump 102 while awaiting engagement with a moving fin 98 to complete the discharge cycle through chute 104. The tendency of the manure to be forced back into the tank through outlet 106 by the action of moving rotor 96 is minimized because manure is not backed up adjacent the outlet 106. Consequently, the efficiency of the unloading process is significantly improved.

Having thus described the invention, what is claimed as new and desired to be secured by Letters Patent is:

1. In a liquid manure handling implement having a holding tank for liquid manure obtained from a pool thereof:
   a pickup housing mounted on one end of said tank and adapted for insertion into said pool,
   said housing having an intake for manure from the pool and said tank having structure on said one end defining an inlet for picked-up manure from the housing;
   an agitator-loader device on said housing adjacent said intake for aggressively churning the pool to thoroughly admix all levels thereof and for concurrently drawing the agitated manure through the housing toward said inlet when the device is actuated,
   said housing being retractable from a lowered, loading position to a raised, transport position,
   said tank having an outlet on said one end of unloading stored manure from the tank;
   a conveyor unit within said tank for conveying manure away from said inlet and toward said outlet; and
   spreader mechanism mounted on said one end of the tank exteriorly thereof adjacent said outlet fordistributing manure from the tank evenly over a field.

2. An implement as claimed in claim 1, wherein said housing is spaced from said one end of the tank and said spreader mechanism is disposed between said one end and said housing.

3. An implement as claimed in claim 1, wherein said conveyor unit includes a pair of opposite lead augers rotatably mounted within said tank in spaced parallel relationship overlying said bottom of the tank.

4. An implement as claimed in claim 1, wherein said spreader mechanism includes a sump in communication with said outlet, said sump extending below the bottom of said tank for receiving manure from said outlet.

5. In a liquid manure handling implement:
   a holding tank having a bottom and a rear end and provided with an inlet and an outlet;
   a spreader mounted on said rear end of said tank exteriorly thereof for distributing manure from said tank evenly across a field;
   a pickup mounted on said rear end and extending rearwardly beyond said spreader, said pickup being adapted for loading manure into said tank through said inlet; and
   a conveyor unit within said tank adjacent said bottom for concurrently drawing manure away from said inlet and moving manure toward said outlet,
   said conveyor unit having means for creating countermoving streams of manure within said tank to thoroughly agitate the manure as the same is conveyed by said unit.

6. An implement as claimed in claim 5, wherein said means includes a pair of opposite lead augers rotatably mounted within said tank in spaced, parallel relationship overlying said bottom of the tank, and transmission means interconnecting said augers for simultaneous rotation of the latter.

7. An implement as claimed in claim 6, wherein said pickup includes an agitator-loader device rotatably mounted adjacent said inlet, said device being interconnected with one of said augers for simultaneous rotation therewith, said one auger being associated with said inlet.

8. An implement as claimed in claim 7, wherein said spreader includes a rotor rigidly adjacent said outlet and connected to the other of said augers for rotation with the latter to distribute manure conveyed through said outlet by said other auger.

* * * * *